United States Patent [19]

Malifaud et al.

[11] Patent Number: 5,696,625
[45] Date of Patent: Dec. 9, 1997

[54] DISTRIBUTOR FOR ELECTROMAGNETIC RADIATION, PARTICULARLY A PROJECTION SCREEN

[76] Inventors: Pierre Leon A. Malifaud, 95 Boulevard Jourdan, 75014 Paris; Gerard Marcel Vuillaume, 9 rue de la Garenne, 63170 Aubiere, Puy de Dome, both of France

[21] Appl. No.: 288,693

[22] Filed: Aug. 12, 1994

Related U.S. Application Data

[63] Continuation-in-part of Ser. No. 136,608, Oct. 15, 1993, abandoned.

[30] Foreign Application Priority Data

Dec. 29, 1989 [FR] France .................. 89 17446

[51] Int. Cl.⁶ .................. G03B 21/56; G03B 21/60; G02B 5/08
[52] U.S. Cl. .................. 359/459; 359/461; 359/851; 359/855
[58] Field of Search .................. 359/850, 851, 359/853, 855, 868, 869, 451, 459, 461, 546, 547, 548, 627, 628

[56] References Cited

U.S. PATENT DOCUMENTS

| | | |
|---|---|---|
| 1,535,985 | 4/1925 | Clark . |
| 1,550,880 | 8/1925 | Clark . |
| 2,075,853 | 4/1937 | Kanolt . |
| 2,381,614 | 8/1945 | Moller et al. . |
| 2,763,184 | 9/1956 | Jackson . |
| 2,961,926 | 11/1960 | Hoffmeister .................. 359/868 |
| 2,974,565 | 3/1961 | Miller . |
| 4,130,109 | 12/1978 | Brueck .................. 359/851 |
| 4,195,913 | 4/1980 | Dourte et al. . |
| 4,241,980 | 12/1980 | Mihalakis . |
| 4,395,581 | 7/1983 | Girard . |
| 4,642,469 | 2/1987 | Bretaudeau et al. .................. 359/868 |
| 4,692,583 | 9/1987 | Kimura et al. .................. 359/851 |
| 5,096,281 | 3/1992 | Windebank et al. .................. 359/868 |

FOREIGN PATENT DOCUMENTS

457020 11/1936 United Kingdom .

*Primary Examiner*—Ricky D. Shafer
*Attorney, Agent, or Firm*—Notaro & Michalos PC

[57] ABSTRACT

A flat screen receives light from a light projector at a projector location, and reflects the light to a spectator area. The screen has a center, spaced apart upper and lower edges and a pair of spaced apart side edges. The screen includes a multiplicity of reflective elements arranged in a plurality of vertical rows. Each row extends between the upper and lower edges of the screen. The plurality of rows are horizontally spaced and distributed between the pair of side edges. The elements of one row are displaced vertically with respect to the elements of an adjacent row and all of said element lie in a common plane so that the screen is flat. Each element has an optically active convex surface with a vertical generatrix and a curved horizontal directrix which crosses the generatrix at a center of the element. Each element has a mean normal straight line extending through the element center, the convex surface of the element being oriented so that an angle between a first mean ray of light from the projector location to the element center, and a second mean ray of light from the element center to a center of the spectator area, is bisected by the mean normal straight line so that the elements have a changing orientation between the screen center and the screen edges, both vertically and horizontally.

7 Claims, 7 Drawing Sheets

DISTRIBUTOR FOR ELECTROMAGNETIC RADIATION, PARTICULARLY A PROJECTION SCREEN

This is a continuation-in-part of application Ser. No. 08/136,608, filed Oct. 15, 1995, now abandoned.

FIELD AND BACKGROUND OF THE INVENTION

Electromagnetic radiation is rarely utilized in the form of the flux directly emitted by the radiation source. In general, a distributor is interposed between the emitting source and the receivers, the function of which is either to concentrate or on the contrary to disperse, to homogenize or on the contrary to create certain inhomogeneities, or to direct in a particular way—in a word, to distribute in a predetermined manner—radiation which is more often emitted uniformly in space. And this applies to all the spectral fields of electromagnetic waves of all wavelengths from the shortest to the longest: gamma rays, X-rays, ultraviolet, visible light, infrared, thermal radiation, microwaves, and radio waves.

These distributors are optical devices, in the broad sense of the word. They operate through their geometric shape and through the texture of their materials, whether they are reflective (catoptric) or transmissive (dioptric), by bending the propagation direction of the radiation. Most often, they are constituted by one or more continuous surfaces such as mirrors, diopters, lenses, or screens. Sometimes they are constituted by a multitude of optically directional elements which together produce the desired effect. Some of these are, for example, Fresnel lenses, faceted light reflectors, and beaded or ribbed projection screens.

Two types of disadvantages are noted in using these distributors, one which relates to defects or deficiencies in the distributor itself, and another which relates to disadvantages encountered in their use.

First, the distribution responds poorly or inadequately to what is sought. For example, uneven lighting is improperly controlled, or even uncontrolled, resulting in solid angles, which particularly spill outside the desired field, thereby reducing the usable output. In the case of projection screens which are intended to distribute the light received from image projectors in a region of space occupied by viewers, two defects are frequently noted. The radiation reflected by the screen is distributed beyond the location of the viewers, which reduces the useful intensity and weakens the contrasts of the images due to the stray light that reflects back toward the screen from the walls and the ceiling. Also, the brightness of the screen is uneven, because the distribution of radiation toward the viewers is much more accurate from the center of the screen than from its edges.

Secondly, in use, radiation distributors often have too much bulk or are hard to manipulate, particularly because of their rigidity.

In the case of projection screens, particularly the large screens which are now increasingly in demand, the best performing of these from the point of view of luminance gain as well as homogeneity have a spherical curvature. As a result, they are rigid and cannot be rolled up, which is a considerable handicap.

Thus, it is noted that in many of their fields of application, distributors of electromagnetic radiation each have their own advantages and disadvantages, which are generally mutually incompatible.

In the field of image projection, which the present invention relates to particularly but not exclusively, there are two main categories of screens.

On one hand are the white lambert screens, that is, those which distribute light uniformly over the entire half-space (of $2\pi$ steradians) facing them. Consequently, they have little light-transmitting capacity.

On the other hand are the so-called directional screens, with glass micro-beads or surfaces that are metallized, generally with an aluminum base, which distribute the light received from the projector in a solid angle which is smaller than $2\pi$ steradians. They are most often flat. Consequently, the luminance they provide decreases substantially from their centers to their edges, both laterally and vertically. The light received from the projector is reflected, moving it farther away from the axis of the screen, and therefore the farther the lit point on the screen is away from the center, the more it is wasted outside the location of the viewers. Furthermore, a screen with a random homogeneous texture, such as a "beaded" screen, distributes the radiation in solid angles of rotation, which does not take into account the asymmetry which generally exists between the angle at which the viewers are located in a horizontal plane, which is wide, and the angle in which they are located in a vertical plane, which is narrow. Some screens have vertical ribs, their directivity thus being greater in a horizontal plane than in a vertical plane. But their major defect remains the substantial falloff in luminance from the center to both the lateral and vertical edges, a defect which is particularly troublesome with large screens.

Other directional screens have a spherical curvature. Screens of this type are smooth and aluminized. One of their defects lies in that, like all smooth screens, their directivity is the same horizontally and vertically, even when the surface of the screen is subdivided into fragments which individually act as screen portions with spherical curvatures. Another major defect lies in that, being rigid, their lack of maneuverability is all the more inconvenient because of their large size.

SUMMARY OF THE INVENTION

In order to remedy the various disadvantages of existing radiation distributors, and to combine the various advantages which are increasingly in demand for development in all their fields of application and which, until now, had not been reconciled, the subject of the invention is a radiation distributor and, in particular, a projection screen.

Generally, this distributor is substantially flat. It is equipped with a very large number of optically directional reflecting elements, each having a convex curvature that is either toroidal or cylindrical, and whose normals, furthermore, individually have an orientation which is determined as a function of the position of the radiation emitter and of a given location of the receivers, in order to assure a homogeneous distribution that covers this location as nearly as possible, and to provide the best level of intensity and viewing quality.

More precisely, the subject of the invention is a distributor of electromagnetic radiation intended to be associated with at least one radiation emitter meant to send it a divergent beam, intended to be disposed facing receivers located in an area of space, toward each of which it must reflect a convergent beam, this distributor being of the substantially flat type and having a surface which has a predetermined plurality of optically directional reflecting elements, characterized in that each of the reflecting elements has an optically active convex surface with either a toroidal or a cylindrical curvature.

According to other characteristics of the invention:

the radiation distributor is such that, in combination:

the mean normal of the convex surface of each element is individually oriented in order to constitute the bisector of the angle formed by the mean ray received from the radiation emitter or emitters at the mean center point of this optically active surface and by the mean ray reflected by this reflecting element toward the mean center point of the area where the receivers must be located, the generatrices and the directrix of the optically active surface, whether toroidal or cylindrical, are respectively configured and disposed in such a way that the radiation reflected by all of these elements toward the area where the receivers must be located is distributed in its entirety within a solid angle that covers this area as nearly as possible;

the reflecting elements are disposed in a network with two families of orthogonal generatrices which have between them divergences of predetermined values;

the elements are disposed quincuncially;

the distributor constitutes a screen intended for the projection of images, the emitter or emitters being image projectors and the receiver or receivers being viewers;

the distributor constitutes a lighting apparatus;

each of the optically directional elements extends vertically from one edge of the distributor to the other, the distributor therefore being intended to be curved into cylindrical form with a view to its utilization.

The invention will be better understood from the detailed description provided below in reference to the appended drawing. It is understood that the description and the drawing are given only as an illustrative and non-limiting example.

DESCRIPTION OF THE PREFERRED EMBODIMENT

Figure 1:
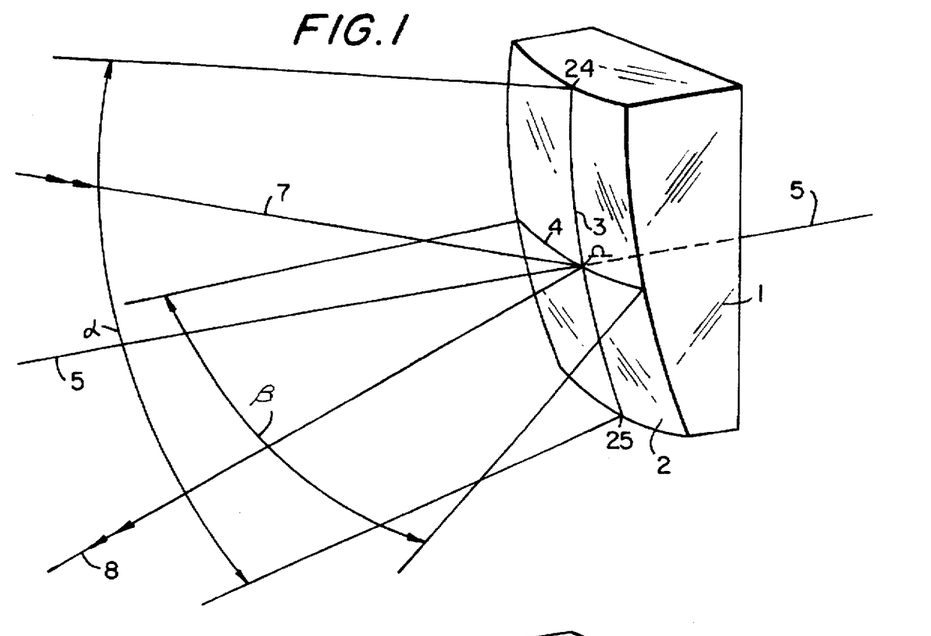
FIG. 1 shows the configuration of a reflecting element according to the invention which has a convex surface with a toroidal curvature.

FIG. 1 schematically shows what characterizes a reflecting element 1 of a radiation distributor according to the invention. This element 1 is characterized in that it has an optically active, convex surface 2 with a toroidal curvature, which has an arc of a circle such as 3 as its generatrix and an arc of a circle such as 4 as its directrix. The mean normal of the element is the straight line 5 which runs through the center point $\Omega$ of this directrix. The center of rotation (not visible in the drawing) of the toroidal surface is situated on the straight line 5. Furthermore, the element 1 is characterized in that its mean normal 5 is individually oriented, on the side of the convexity of the surface, in order to constitute the bisector of the angle formed by the mean ray of light 7 received at its mean center point $\Omega$ from a radiation emitter or emitters (not visible in this figure) with which it is associated, and by the mean ray of light 8 reflected by this reflecting element back toward the mean center point of the area of space (not visible in this figure) where the associated receivers are located.

Figure 2:
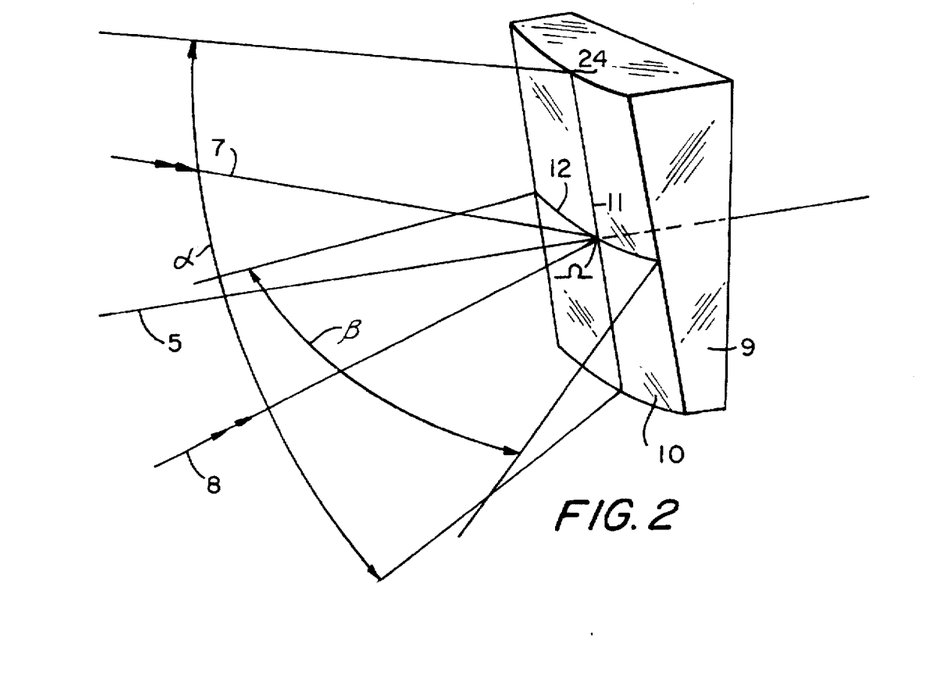
FIG. 2 shows the configuration of a reflecting element according to the invention which has a convex surface with a cylindrical curvature.

In FIG. 2, the reflecting element 9 according to the invention is characterized in that it has a convex surface 10 with a cylindrical curvature, which has a segment of a straight line such as 11 as its generatrix and an arc of a circle such as 12 as its directrix.

Figure 3:
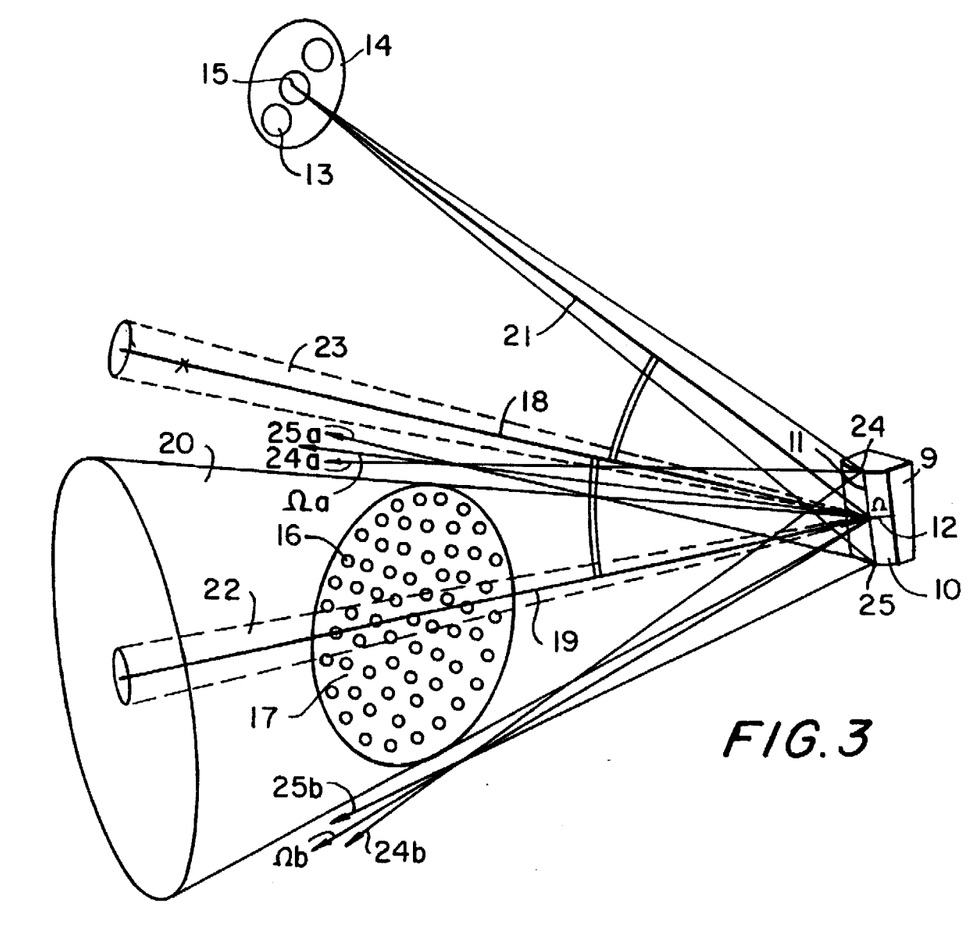
FIG. 3 shows in a very schematic way that which characterizes a distribution of radiation from a reflecting element according to the invention.

FIG. 3 explicitly shows that which characterizes the individual orientation of the reflecting element 9 in relation to the emitters and the receivers with which it is associated.

The radiation emitters, such as 13, are situated in an area 14 with a mean center point 15. The receivers of the radiation to be distributed, such as 16, are situated in a region 17 whose volume in space is predetermined.

As a function of the location of the receivers and the position of the emitters, the orientation of the element 9 is characterized by that of the mean normal 18 of the mean center point $\Omega$ of its reflecting surface. This mean normal 18 is oriented so that the angles it forms with two predetermined straight lines are equal. The first of these straight lines is the mean axis 19 of the solid geometric angle 20 which has its vertex at the center point $\Omega$ of the element 9, and which covers the volume of the region 17 as nearly as possible. The second of the straight lines under consideration, 21, joins the mean center point $\Omega$ of the element to the mean center point 15 of the area 14 where the emitters are situated. The mean normal 18 forms two equal angles with the mean axis 19 and with the straight line 21. In this way, the element 9 assures optimum reflection toward the receivers of the radiation originating from the emitters.

Of course, since the region 17 has a volume whose contours are only approximately defined, or can even vary slightly, a small solid angle 22 should be considered for the mean axis 19, rather than a strict straight line, for example on the order of several ten-thousandths of a radian, that is, several degrees in a flat angle, which is entirely sufficient in practice. Consequently, a very small solid angle 23 should be considered for the orientation of the normal 18.

Secondly, according to the invention, the element 9 is characterized by the optical configuration of its entire active surface with a view to redistributing the radiation in a solid angle whose angles in all the planar sections are at least equal to those of the solid geometric angle 20. In FIG. 3, starting from the mean center point Ω and from the edges 24 and 25 of the element 1, the radiation is distributed between the rays Ωa, 24a, 25a on one side of the axis 19, and between the rays Ωa, 24b, 25b on the other side, which originate from the points Ω, 24, 25 respectively. The region 17 is thus entirely within the angles bounded by these rays.

The optical configuration of the active surface of the element 1 or 2 is also defined by the more or less wide diffusion with which the rays are reflected back to it. It is not desirable, in the large majority of cases, for a distributor to be a specular mirror. What is expected of it is that, when receiving a beam of radiation at a point on its surface, it diffuse the radiation in a solid angle of predetermined value around a specular direction defined by the curvature of this surface. For the projection screens according to the invention, this value is for example on the order of 15° to 20° from the two sides of the axis, in a planar section.

To return to one of the principal advantages resulting from the toroidal or cylindrical curvature that characterizes the reflecting elements according to the invention, it is seen in FIG. 1 that the distribution of reflected radiation can be different in the vertical plane and the horizontal plane. According to the invention, control of these angles is determined by the possibility of choosing more or less accentuated curvatures for the generatrix 3 and for the directrix 4. For the generatrix 3, the choice of a slight curvature, which may even be nil in the case of a cylindrical surface such as that represented in FIG. 2, makes it possible, for example, to distribute the reflected radiation vertically in a predetermined angle α with a slight aperture, which corresponds to the most common location of the viewers in a screening room. For the directrix 4, a more pronounced, variable curvature makes it possible to distribute the reflected radiation horizontally in a predetermined angle with a wide aperture, which corresponds to the location of the viewers.

Thus, the distributor according to the invention performs better than a simple distributor with a spherical curvature, whether it is constituted by a single spherical segment or by a plurality of small spherical segments. The distributor according to the invention not only makes it possible to cause the light it reflects to converge toward a center point, but it also provides different distributions in two perpendicular planes, specifically the vertical and horizontal planes, which has the effect of considerably increasing the luminance gain in comparison with any other distributor.

For example, in conformity with the invention, in a motion picture theater, in which the distributor is a screen, the emitter is an image projector, and the receivers are the spectators whose eyes are all situated in an area that is more extensive in width than in height, the distribution provided by the screen according to the invention is perfectly adapted to this particular disposition.

By making it possible to vary the distribution independently in height and in width, the invention allows itself to be adapted equally well to any other case: narrow rooms, an elevated disposition of the spectators on several balconies, etc., which no known device makes it possible to achieve.

The optically directional elements according to the invention are capable of being disposed in accordance with all distributions, including random distributions, in order to constitute the entire active surface of the distributor.

Figure 4:
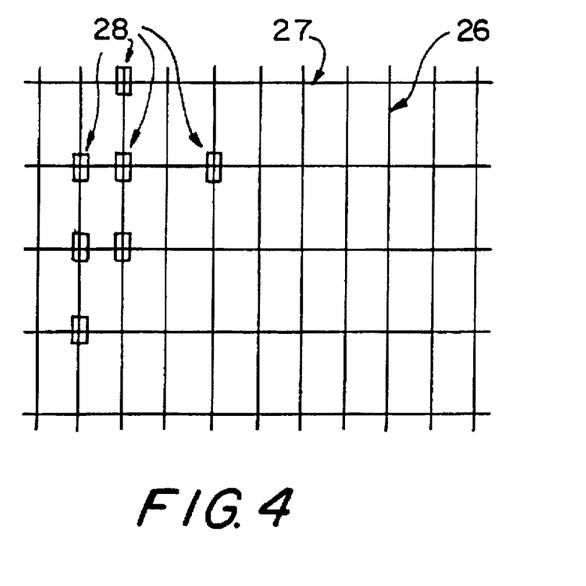
FIG. 4 shows an example of the distribution of reflecting elements in a network with two families of linear orthogonal generatrices between them.

FIG. 4 represents in a very schematic way a distribution in a network with two families of linear orthogonal generatrices between them. In each of the two families, the generatrices are straight orthogonal parallel lines, such as 26 and 27. The elements, such as 28, are distributed in this network, but only a few of these have been represented in the drawing.

The generatrices may have divergences of predetermined values between them. These divergences may be equal to one another in only one direction or in both directions. They can also increase or decrease between the center and the edges. In other words, they can have a linear "pitch," which is either constant or variable, between them.

The divergences of predetermined values may be considered not only linearly but also angularly, the orientations of the elements distributed on linear generatrices of the same family having between them a divergence that is constant, or that increases or decreases between the center and the edges of the distributor. In other words, having a constant or variable angular "pitch."

Figure 5A:
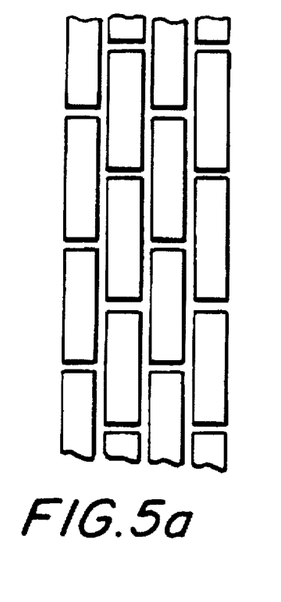
FIGS. 5a and 5b show examples of horizontal and quincuncial displacement of vertically aligned elements.
Figure 5B:
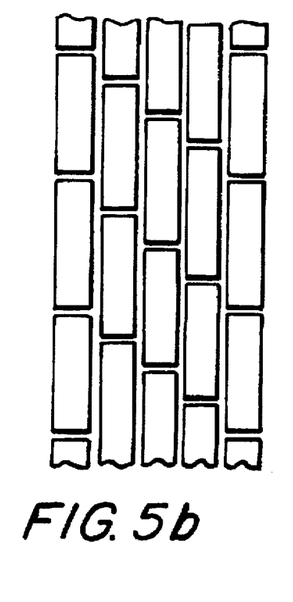

The optically directional elements may advantageously be displaced in relation to one another so as to suppress or at least attenuate the effects of bright or dark lines which could, due to their contiguity, cause the inevitable hiatus which they have between them to grow. FIGS. 5a and 5b represent two examples in which the elements aligned in the vertical sense or vertical rows, that is to say in accordance with one of the families of linear orthogonal generatrices, are horizontally displaced in relation to one another, in accordance with the other family. That is, the vertical rows of elements are offset, one from the other, in a horizontal direction across the screen.

The distributor according to the invention can be a projection screen associated with one or more image projectors and with viewers placed in a certain region of space. This application is particularly valuable.

Figure 6:
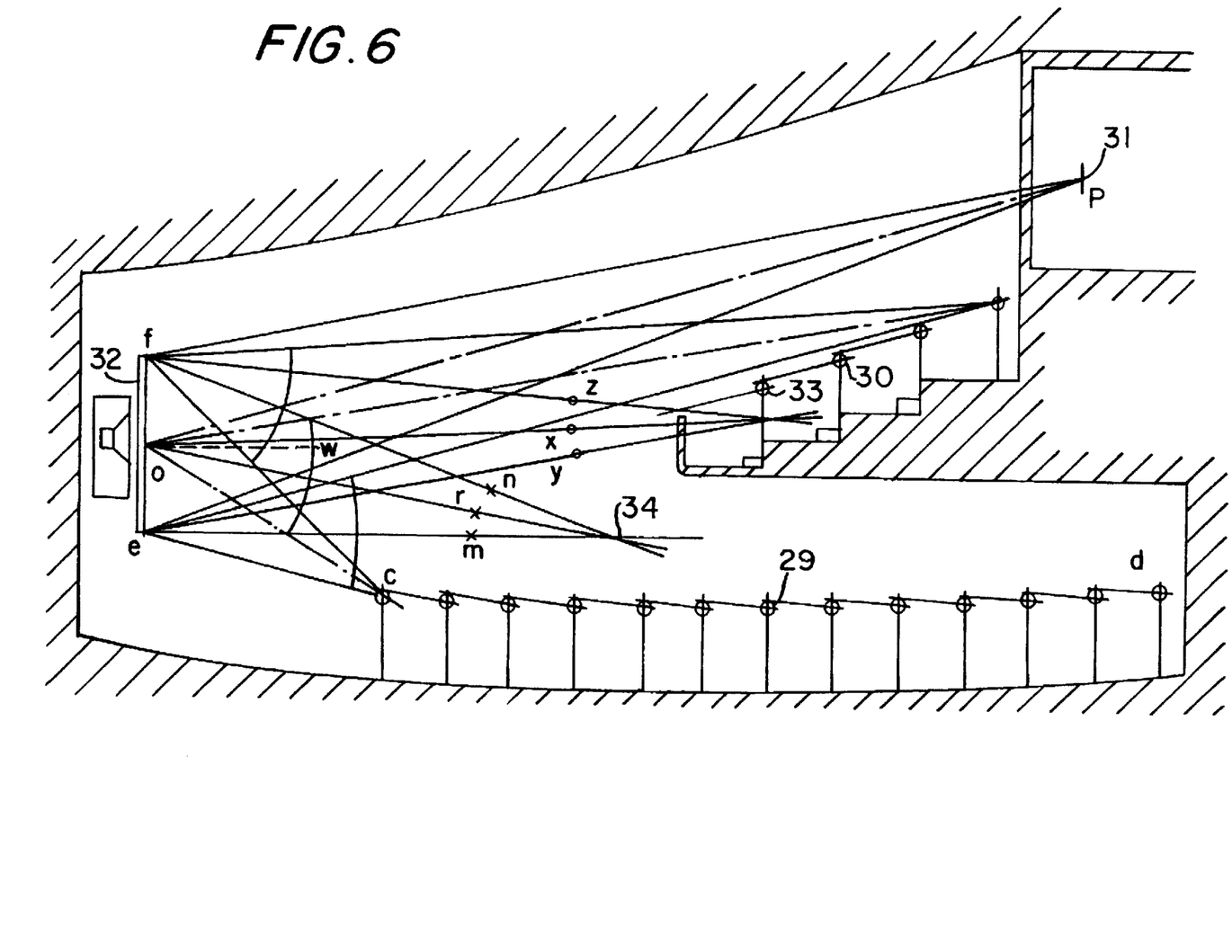
FIG. 6 represents in vertical section an image projection installation according to the invention.
Figure 7:
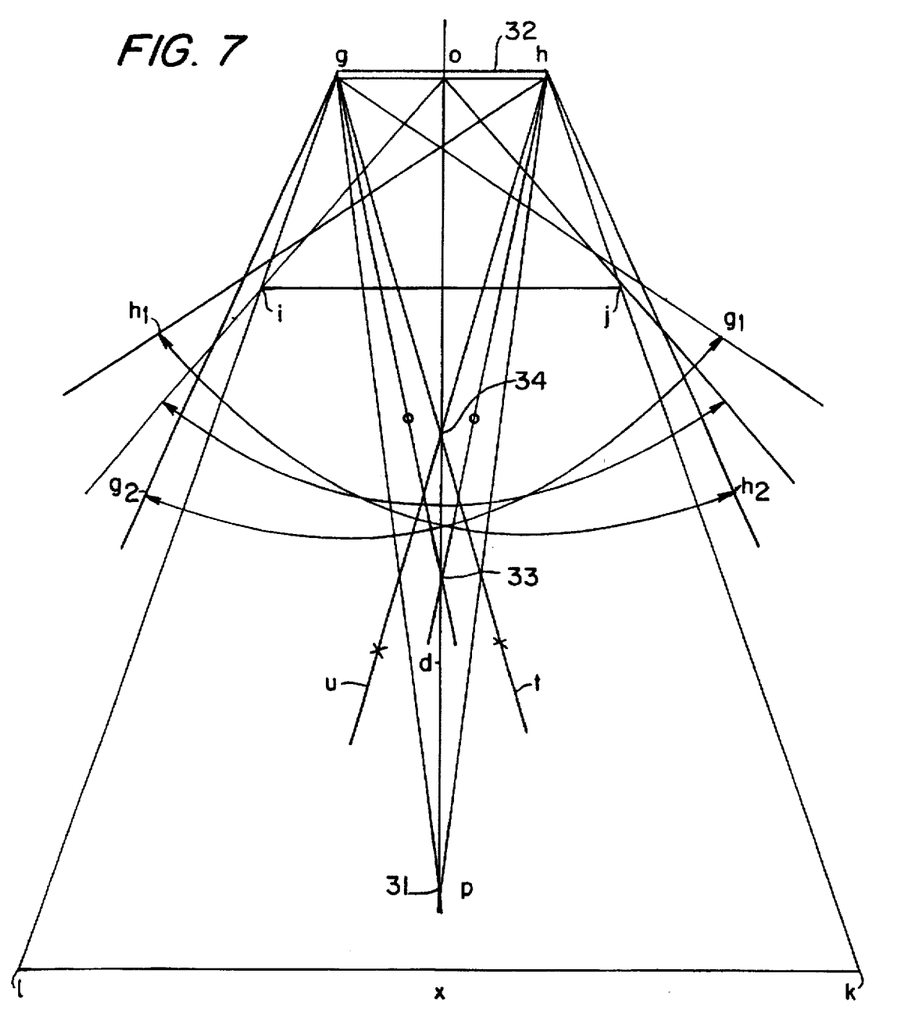
FIG. 7 shows a top view of the same installation.

FIGS. 6 and 7 show an example of a projection installation according to the invention, FIG. 6 in a meridian vertical section, and FIG. 7 in a horizontal projection.

FIG. 6 schematically represents a cinema which conforms to the standards currently in effect in France. Viewers, such as 29, 30, are seated in chairs placed in a space which extends vertically according to a, b, c, d. An image projector 31 situated at a point p sends light which covers a projection screen 32. This is constituted by a multitude of optically directional elements, each of which is configured as indicated in FIGS. 1 and 2 and each of which has a mean normal oriented as has been revealed in reference to FIG. 3. In FIG. 6, the determination of these orientations is presented for three elements of the screen 32: the element o, at the center of the screen; the element e, at the lower edge in the meridian vertical section; and the element f, at the upper edge. For the element o, the location of the viewers is included in the angle aoc, whose bisector or mean axis is o-r. According to the invention, the mean normal at the mean center point of the element o is the bisector o-x of the angle top formed by the axis o-r and the straight line o-p. For the element e, the location of the viewers is included in the angle aec, with the axis e-m. The mean normal is the bisector e-y of the angle mep. For the element f, the location of the viewers is included in the angle afc, with the axis f-n. The mean normal is the bisector f-z of the angle nfp.

Each of the elements diffuses the light in a solid angle whose axis is the ray that is specularly reflected from the incident ray sent by the projector to the mean center point of the element, the angle of reflection being equal to the angle of incidence in relation to the mean normal. For example, at the point o, the incident ray is p-o. It is reflected specularly around the normal o-x according to the ray o-r, which coincides with the axis of the angle aoc which covers the location of the viewers, since according to the invention, the mean normal o-x has been determined as the bisector of the angle rop. Thus, the light received by the element o is diffused toward the viewers in a solid angle beginning at the point o, which has the same axis as the solid geometric angle aoc which covers the location of the viewers in the vertical plane as nearly as possible. The same goes for the elements e and f. The angles encompassing the location of the viewers starting from the points o, e, f are indicated in the figure by arcs ending in arrows.

These angles, in this example, have a value of approximately 40°. It is therefore sufficient that the reflective covering of the generatrices, such as 3 (FIG. 1), of the elements, diffuses the light in an angle of at least 20° around the specular ray, so that all the viewers receive it in the vertical planes. This size on the order of 20° is easy to obtain in practice. On the other hand, it is advantageous for the angle of diffusion to exceed this order of size as little as possible. This would be useless and would diminish the luminance gain obtained by the screen. The optical configuration of the elements, as described in reference to FIGS. 1 and 2, to FIG. 6, and to FIGS. 7 and 8 below, makes it possible to assure optimum distribution.

It is noted in this example that the mean normals x, y, z of the elements o, e, f perceptibly converge toward a confined area 33, which is tied to the fact that the mean axes r, m, n of the angles which geometrically cover the location of the viewers converge toward a confined area 34 themselves, as happens in the most common types of installations. The straight line e-f is optically equivalent to a circular arc whose center point would be situated in the confined area 33.

It is also noted that the geometric axis o-w of the screen does not coincide with the normal o-x at its center. It is therefore necessary to tilt the screen slightly so as to make o-w and o-x coincide. The constructions in FIG. 6 are created with a vertical position of the screen which, optically, does not introduce perceptible divergences. It is also possible to orient the optically directional elements in a slightly different way in order to compensate for the minute divergence between o-x and o-w. When, in other cases, the divergence proves to be more substantial, it is appropriate either to tilt the screen accordingly, or to configure the screen so that its optical center point happens to be the foot of the perpendicular leading from a mean point in the area 73 to the plane of the screen in its vertical position.

FIG. 7 represents in a very schematic way the same installation in a horizontal projection. The location of the viewers occurs within a trapezoid i j k l in such a way that, in accordance with the standards in effect in France, the angle i o j has a value smaller than 100° and that the sides i-l and j-k of the trapezoid form an angle of approximately 20° with the axis ox' (geometric projection of o-x on the horizontal plane passing through o, in FIG. 6). The lateral edges of the screen are g and h. The geometric projection of the projector P is (31) in the plane in FIG. 7. That of the area 33 is (33).

The differences between the true values of the angles in an inclined plane passing through o and p and their values in the horizontal plane in FIG. 7 are minute. In the example described, the angle of these planes w o p being on the order of 15°, the relation between these values is on the order of 1°, as is apparent from the well known trigonometric formula linking angles to their projections in a plane.

The same geometric construction as that described in reference to FIG. 6 shows that the solid angles in which the light originating from the elements o, g, h is diffused have as their axes o-x' g-t, h-u, which converge in a confined area (34), which itself is perceptibly the geometric projection of the area 34 in FIG. 6.

The screen 32, which is flat, is therefore optically equivalent in its entirely to a screen with a spherical curvature which has the geometric center 33.

However, and this is a major difference from the known screens with spherical curvature or the equivalent, in order for the solid angles in which the light is diffused from the elements o, g, h to cover the location of the viewers entirely, these elements are configured, according to the invention, so as to diffuse the light in a horizontal angle to a much greater degree than in a vertical angle. In FIG. 7, the angles covering this location as nearly as possible are predetermined from the value of the angle i o j originating from the center of the screen. This angle has a value of approximately 80°, in this example. Angles of the same value, originating from the elements g and h, are represented in FIG. 7 by arcs ending in arrows. They extend in the directions g-$g_1$ and g-$g_2$ and in the directions h-$h_1$ and h-$h_2$, respectively.

This result is obtained due to the optical configuration of the elements according to the invention, which has already been represented roughly in FIGS. 1 and 2, and in a more explicit manner in FIG. 3.

Figure 8:
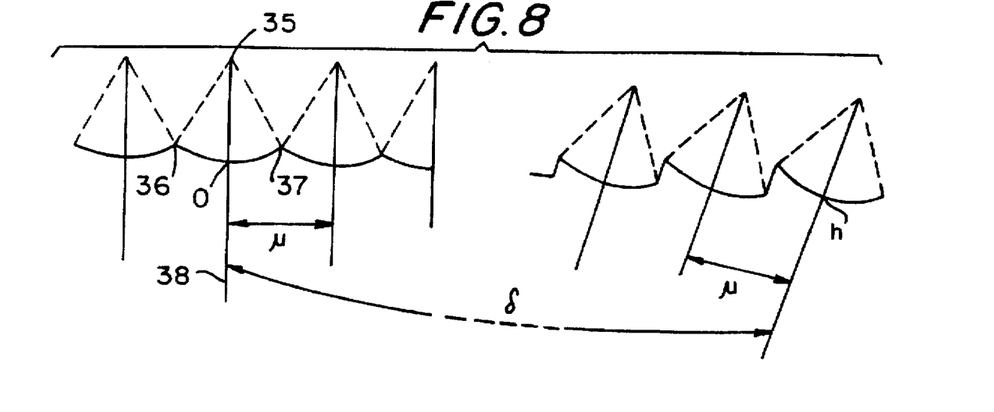
FIG. 8 shows in horizontal section the disposition of the elements at the center and at the edge of a projection screen according to the invention.

FIG. 8 shows the shape and the individual orientation of the optically directional elements, in a horizontal section at the center of the screen. The left part of the figure corresponds to the center of the screen, the right part to a lateral edge. Here again are the element o and the element h, represented by their geometric positions in FIG. 7, are found here. All these elements, from o to h, have an identical curvature but are oriented differently. For the element o, for example, the curvature is an arc of a circle with the center point 35 which extends between the points 36 and 37. In this example, the angle at the center of the arc has a value of 60°. A wide solid angle of diffusion is assured by the curvature, the extreme specular rays forming an angle of approximately 120°, for example. The same goes for the element h.

The angle between the mean normals of the elements o and h is equal to the angle δ represented in FIG. 7. The orientation of the normals of the elements between o and h varies progressively according to an angular "pitch" μ whose value is equal to that of the angle δ divided by the number of elements between o and h. This progressive variation of the orientation of the elements, starting from the center, gradually introduces displacements between the ends of the arcs in the horizontal plane. These displacements, at first almost imperceptible in the central region, become proportionally more accentuated as the elements move further away from the center. If the elements are small, the displacements remain very slight. For example, for a screen that is 4 meters wide at its base with elements whose arcs have a chord of 2 millimeters, the largest displacement between the element h and the preceding element is on the order of 0.4 millimeters, for a ray with a spherical curvature of the screen equivalent to approximately 8 meters.

Figure 9A:
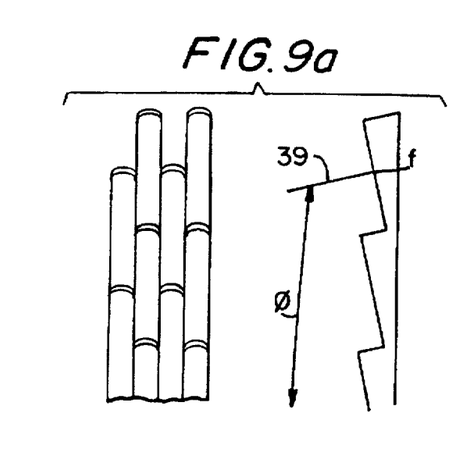
FIGS. 9a and 9b show the disposition of the elements in vertical elevation and in profile section.
Figure 9B:
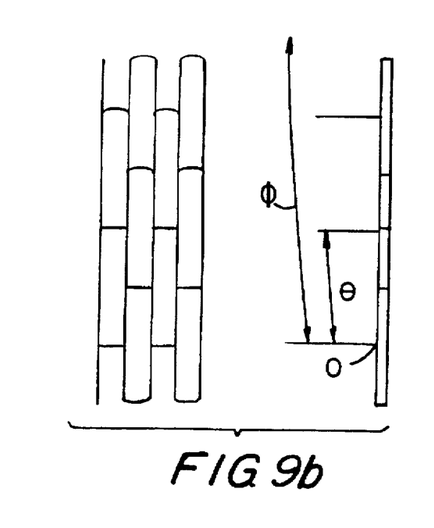

FIGS. 9a and 9b show the shape and the individual orientation of the optically directional elements, in a vertical section at the center of the screen. In this plan, it is the generatrices such as 3 and 11 in FIGS. 1 and 2 that are represented. At the center of the screen, the mean normal 38 of the element o is oriented on to the axis of the screen. As the elements move away from the center, their mean normals incline proportionally, converging toward the area 33 represented in FIG. 6, all the way up to the orientation of 39 for the element f. The displacements, imperceptible at first, become more accentuated all the way up to the element f at the upper edge of the screen. The angle between the mean normals of the elements o and f, designated by φ in FIGS.

9a and 9b, is equal to the angle between the directions o-w and f2 in FIG. 6. The orientation of the normals of the elements between o and f varies progressively according to an angular "pitch" θ whose value is equal to that of φ divided by the number of elements between o and f.

All these elements are in convex relief on the screen, which is flat. The screen can be of molded plastic material, such as polyurethane elastomer, reinforced with glass fibers and metallized, particularly with aluminum. The mold therefore includes a multitude of portions of hollow cylinders wherein the orientation of the mean normals of the linear generatrices is peculiar to each element, each of which converges toward a confined area. This structure can be produced on a sheet of aluminum by means of a cutter guided by a numerical control with five axes, or by any other process, such as stereolithography by means of a laser.

In the case of milling, the screen as seen from the front has an aspect such as that represented in FIG. 9b at the center of the screen, and in FIG. 9a at its upper edge. The disposition of the elements is quincuncial with a simple horizontal displacement.

A projection screen according to the invention has a certain number of advantages:

It is flat.

It can be rolled up.

It concentrates the radiation toward the viewers in angles with apertures which have been predetermined to be optimal, which are different horizontally (for example 100°) and vertically (for example 40°).

It has very even brightness. Its luminance gain is for example on the order of 4 to 5 for an aperture of 100°×40°.

It improves the contrasts and the color saturation while directing the stray rays reflected back toward the screen by the walls and the ceiling away from the location of the viewers. The various advantages, especially the gain in luminosity and the improvement of contrasts, are all particularly noticeable in large-screen video projection.

The distributors according to the invention relate to all the spectral fields of electromagnetic radiation. They can constitute apparatuses for lighting with visible light or infrared radiation ("black light"). The radiation concerned can be ultraviolet, particularly in an artificial tanning installation or equipment for various medical treatments. These distributors can be used to distribute thermal radiation, with a view to heating predetermined surfaces or volumes. They can be put to use in microwave ovens in order to distribute the radiation emitted by magnetron. It can, in an original way, constitute wall coverings such as wallpaper, embossed in conformity with the structures proposed according to the invention, so as to distribute the light coming from the windows of a building in a predetermined manner.

Figure 10:
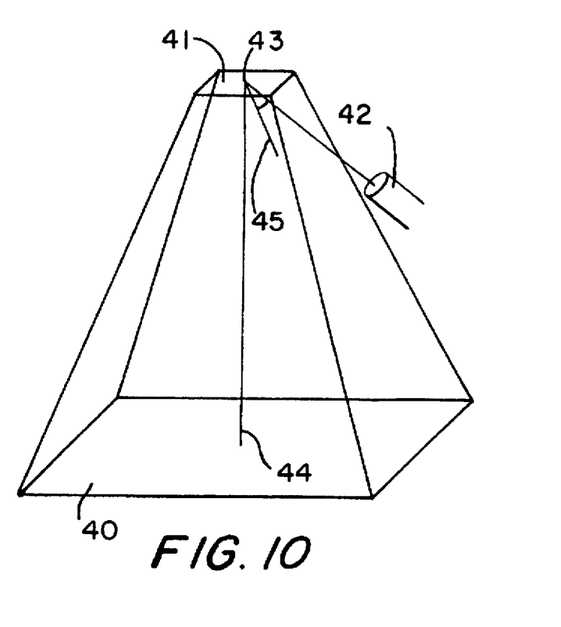
FIG. 10 represents a distributor according to the invention which constitutes a lighting device.

FIG. 10 represents in a very schematic way a radiation distributor according to the invention which constitutes a lighting apparatus. The surface to be lit is a rectangle 40, which is horizontal. A distributor 41 receives the light originating from a spotlight 42. The solid angle covering the surface 40, which originates from the mean center point 43 of the distributor, has as its axis the straight line joining the center point 43 to the center point 44 of this surface. The optically directional element situated at the center point 43 of the distributor has a mean normal 45 which is the bisector of the angle formed by the straight line joining the center points 43 and 44, and the straight line joining the center point 83 to the mean center point of the spotlight 42. All the other elements of the distributor have mean normals determined in the same manner. What has been described previously applies to all the distributors according to the invention.

Figure 11:
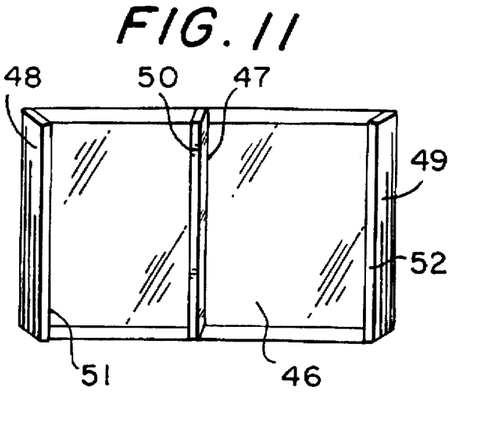
FIG. 11 shows the disposition of the elements for a flat screen that is geometrically equivalent to a cylindrical screen.
Figure 12:
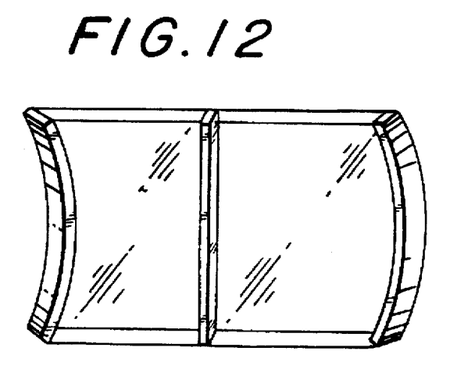
FIG. 12 shows the same disposition after curving the screen.

Another case is that of distributors which are intended to be used with a nonplanar curvature, represented in FIGS. 11 and 12. FIG. 11 first represents a projection screen 46 whose optically directional elements such as 47, 48, 49 extend vertically from one edge of the screen to the other. Each of these elements has a surface with a cylindrical curvature, such as 50, 51, 52. The mean normals of the curved surfaces such as 50, 51, 52 are oriented according to the invention, that is to say, they are convergent. This flat screen is equivalent to a screen with a cylindrical curvature wherein the center of curvature occurs at the center where the mean normals of the elements 47, 48, 49 converge and wherein the generatrices would be vertical. This screen can be geometrically equivalent to a screen with a spherical curvature if, it is curved during its use, as represented in a schematic way in FIG. 12. It therefore presents the viewers with a concave cylindrical surface whose generatrices are horizontal. This new curvature with horizontal generatrices, combined with the cylindrical curvature with vertical generatrices to which the flat screen, as represented in FIG. 11, is equivalent, results in an overall effect of double curvature; in other words, it is equivalent to the effect of a spherical curvature.

Figure 13:
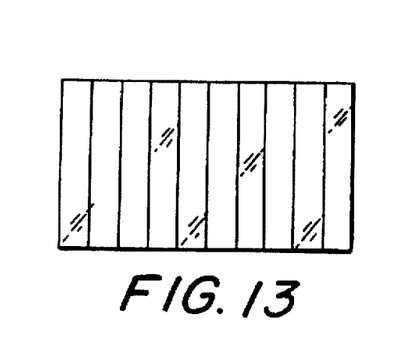
FIGS. 13, 14, and 15 show the three states of a screen according to the invention, respectively the flat, curved, and rolled up states.
Figure 14:
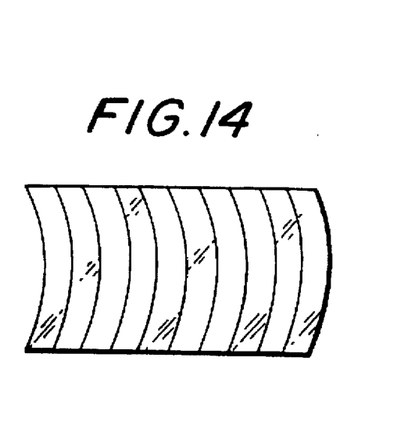
Figure 15:
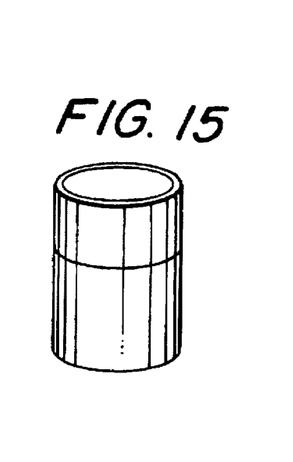

FIGS. 13, 14, 15 represent in diagrams the dispositions of such screens, corresponding to FIGS. 11 and 12. According to these diagrams, these screens are, respectively, flat (FIG. 13), curved (FIG. 14) or rolled up (FIG. 15).

We claim:

1. A flat screen for receiving light from a light projector at a projector location, and for reflecting the light to a spectator area, the screen having a center, spaced apart upper and lower edges and a pair of spaced apart side edges, the screen comprising:

a multiplicity of reflective elements arranged in a plurality of vertical rows, each row extending between the upper and lower edges of the screen, the plurality of rows being horizontally spaced and distributed between the pair of side edges, the elements of one row being displaced vertically with respect to the elements of an adjacent row, all of said elements lying in a common plane so that the screen is flat:

each element having an optically active convex surface with a vertical generatrix (3,11) and a curved horizontal directrix (4,12) which crosses the generatrix at a center of the element;

each element having a mean normal straight line (5) extending through the element center, the convex surface of the element being oriented so that an angle between a first mean ray of light (7) from the projector location to the element center, and a second mean ray of light (8) from the element center to a center of the spectator area, is bisected by the mean normal straight line (5) so that the elements have a changing orientation between the screen center and the screen edges, both vertically and horizontally.

2. A screen according to claim 1 wherein a rear surface of each element is co-planar with the common plane, the screen being structured so that it can be rolled up.

3. A screen according to claim 1 wherein the generatrix of each element is curved so that the convex surface is toroidal.

4. A screen according to claim 3 wherein a rear surface of each element is co-planar with the common plane, the screen being structured so that it can be rolled up.

5. A screen according to claim 1 wherein the generatrix of each element is straight so that the convex surface is cylindrical.

6. A screen according to claim 5 wherein a rear surface of each element is co-planar with the common plane, the screen being structured so that it can be rolled up.

7. A screen according to claim 1 wherein a size and number of the elements between the upper and lower edges, and between the pair of side edges of the screen are selected to reflect light to the spectator area which covers a vertical angle of about 40 degrees between a forward and a rear portion of the spectator area, and a horizontal angle of about 20 degrees–100 degrees between the rear and forward portions of the spectator area.

* * * * *